(12) United States Patent
Louderback (10) Patent No.: US 10,598,871 B2
(45) Date of Patent: Mar. 24, 2020

(54) ACTIVE OPTICAL CABLE FOR WEARABLE DEVICE DISPLAY

(71) Applicant: Inneos LLC, Pleasanton, CA (US)

(72) Inventor: Duane Louderback, Zephyr Cove, NV (US)

(73) Assignee: INNEOS LLC, Pleasanton, CA (US)

( * ) Notice: Subject to any disclaimer, the term of this patent is extended or adjusted under 35 U.S.C. 154(b) by 0 days.

(21) Appl. No.: 15/706,032

(22) Filed: Sep. 15, 2017

(65) Prior Publication Data

US 2018/0017742 A1 Jan. 18, 2018

Related U.S. Application Data

(63) Continuation-in-part of application No. 15/152,397, filed on May 11, 2016.

(51) Int. Cl.
*G02B 6/36* (2006.01)
*G02B 6/38* (2006.01)
(Continued)

(52) U.S. Cl.
CPC .......... *G02B 6/4206* (2013.01); *G02B 6/428* (2013.01); *G02B 6/4214* (2013.01); *G02B 6/4246* (2013.01); *G02B 6/4267* (2013.01); *G02B 6/4281* (2013.01); *G02B 6/4284* (2013.01); *G02B 6/4286* (2013.01); *G02B 6/4415* (2013.01); *H04B 10/2504* (2013.01); *H04B 10/40* (2013.01)

(58) Field of Classification Search
USPC ............................................. 385/54, 92, 135
See application file for complete search history.

(56) References Cited

U.S. PATENT DOCUMENTS

| 4,471,174 A | * | 9/1984 | Nava | ........................ | A42B 3/30 |
| | | | | | 379/430 |
| 7,046,215 B1 | | 5/2006 | Bartlett | | |

(Continued)

OTHER PUBLICATIONS

Office Action dated Apr. 10, 2018 in U.S. Appl. No. 15/152,397.
(Continued)

*Primary Examiner* — Eric Wong
(74) *Attorney, Agent, or Firm* — Pillsbury Winthrop Shaw Pittman LLP (57) ABSTRACT

An active optical cable (AOC) for a helmet mounted display (HMD) or goggles includes a transceiver module having a rigid-flex or flex connector packaging to physically couple with an electrical data interface of the HMD or goggles. The transceiver module includes one or more media converters to receive electrical data of multiple formats from the HMD or googles and convert the received electrical data to a common format, and an optical engine communicatively coupled to the one or more media converters to output the converted electrical data as optical data. The AOC includes a cable assembly including at least fiber optic cables with one end of the cable assembly communicatively couple to the transceiver module to receive the optical data output from optical engine; and another transceiver module having a quick-release connector packaging and communicatively coupled to other end of the cable assembly to receive the optical data.

22 Claims, 10 Drawing Sheets

(51) Int. Cl.
*G02B 6/42* (2006.01)
*H04B 10/40* (2013.01)
*G02B 6/44* (2006.01)
*H04B 10/25* (2013.01)

(56) References Cited

U.S. PATENT DOCUMENTS

| | | | |
|---|---|---|---|
| 7,758,255 B2 | 7/2010 | Jones | |
| 9,277,673 B2 | 3/2016 | Droesbeke | |
| 9,445,639 B1* | 9/2016 | Aloumanis | A42B 3/0453 |
| 2003/0201911 A1* | 10/2003 | Kennedy | G01C 23/005 |
| | | | 340/980 |
| 2006/0048286 A1* | 3/2006 | Donato | A42B 3/042 |
| | | | 2/422 |
| 2008/0048931 A1 | 2/2008 | Ben-Ari | |
| 2008/0136916 A1 | 6/2008 | Wolff | |
| 2011/0052122 A1 | 3/2011 | Brucher | |
| 2014/0270800 A1* | 9/2014 | Masarik | H04B 10/2503 |
| | | | 398/131 |
| 2014/0348478 A1 | 11/2014 | Isenhour | |
| 2016/0125669 A1 | 5/2016 | Meyer | |
| 2016/0334591 A1* | 11/2016 | Wood | G02B 6/4246 |
| 2017/0131488 A1 | 5/2017 | Yu | |
| 2017/0271797 A1 | 9/2017 | Ito | |

OTHER PUBLICATIONS

Office Action dated Sep. 18, 2018 in U.S. Appl. No. 15/152,397.
Office Action dated Mar. 1, 2019 in U.S. Appl. No. 15/152,397.
"Breakaway Fail Safe Lanyard Release Plug," https://www.amphenol-aerospace.com/38999-Series-and-Types/breakaway-fail-safe-lanyard-release-plug, 2019.
GORE® MIL-STD-1760 Assemblies for Military Aircraft, https://www.gore.com/products/gore-r-mil-std-1760-assemblies?view=section3422, Feb. 25, 2019.
Notice of Allowance dated Jun. 13, 2019 in U.S. Appl. No. 15/152,397.

* cited by examiner

Figure 11

US 10,598,871 B2

ACTIVE OPTICAL CABLE FOR WEARABLE DEVICE DISPLAY

CROSS REFERENCE TO RELATED APPLICATION

This patent application is a continuation-in-part of and claims priority to non-provisional patent application Ser. No. 15/152,397 filed on May 11, 2016, and is incorporated by reference herein in its entirety.

TECHNICAL FIELD

This patent document relates to active optical cables for wearable device displays, such as in a helmet or goggles.

BACKGROUND

Copper cables are typically used in helmet mounted displays or virtual reality goggles for electronic communication. The copper cables can be heavy, bulky, and radiate heat. In addition, copper cables tend to be limited with regards to data types, communication speed, and data transfer.

SUMMARY

Disclosed are methods, systems, and devices that provide for active optical cables with connectors customized for a wearable display associated with a helmet or goggles. The connectors can include a board-mount connector, a flexible connector, or a flex-rigid connector.

In one aspect, an active optical cable (AOC) for a wearable display associated with a helmet or goggles includes a transceiver module having a rigid-flex or flex connector packaging to physically couple with an electrical data interface of the helmet or goggles. The transceiver module includes one or more media converters to receive electrical data of multiple formats from the helmet or goggles and convert the received electrical data to a common format, and an optical engine communicatively coupled to the one or more media converters to output the converted electrical data as optical data. The AOC includes a cable assembly including at least fiber optic cables with one end of the cable assembly communicatively couple to the transceiver module to receive the optical data output from an optical engine; and another transceiver module having a quick-release connector packaging and communicatively coupled to other end of the cable assembly to receive the optical data.

Other aspects, features, and advantages of the present disclosure will become apparent from the following detailed description, the accompanying drawings, and the appended claims.

DETAILED DESCRIPTION

Examples and implementations of the disclosed technology can provide for active optical cables with connectors customized for a wearable device display.

Helmet Mounted Display Application

Figure 1:
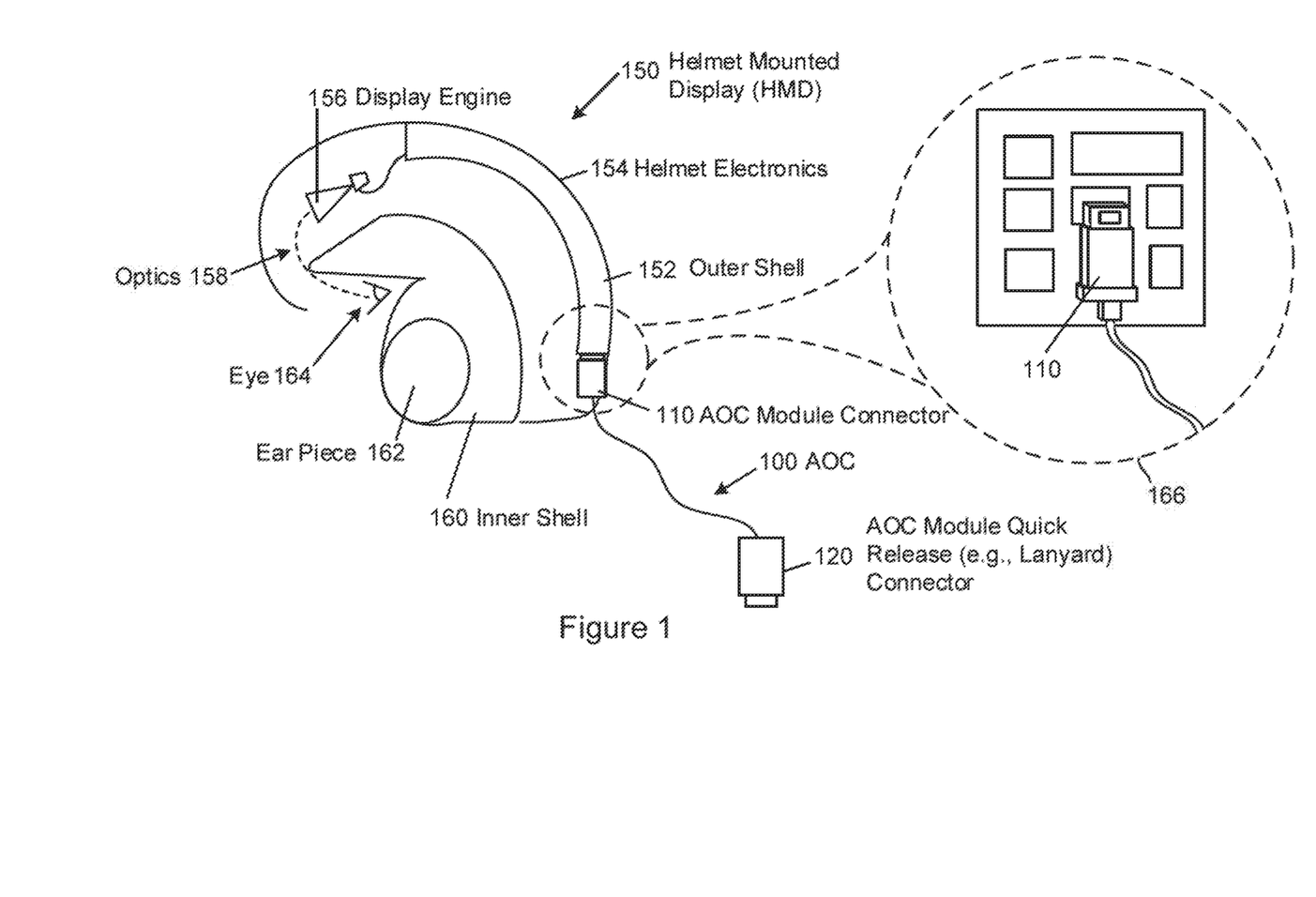
FIG. 1 is an application view showing an exemplary active optical cable connected to a helmet mounted display with a board mount connector.
Figure 2:
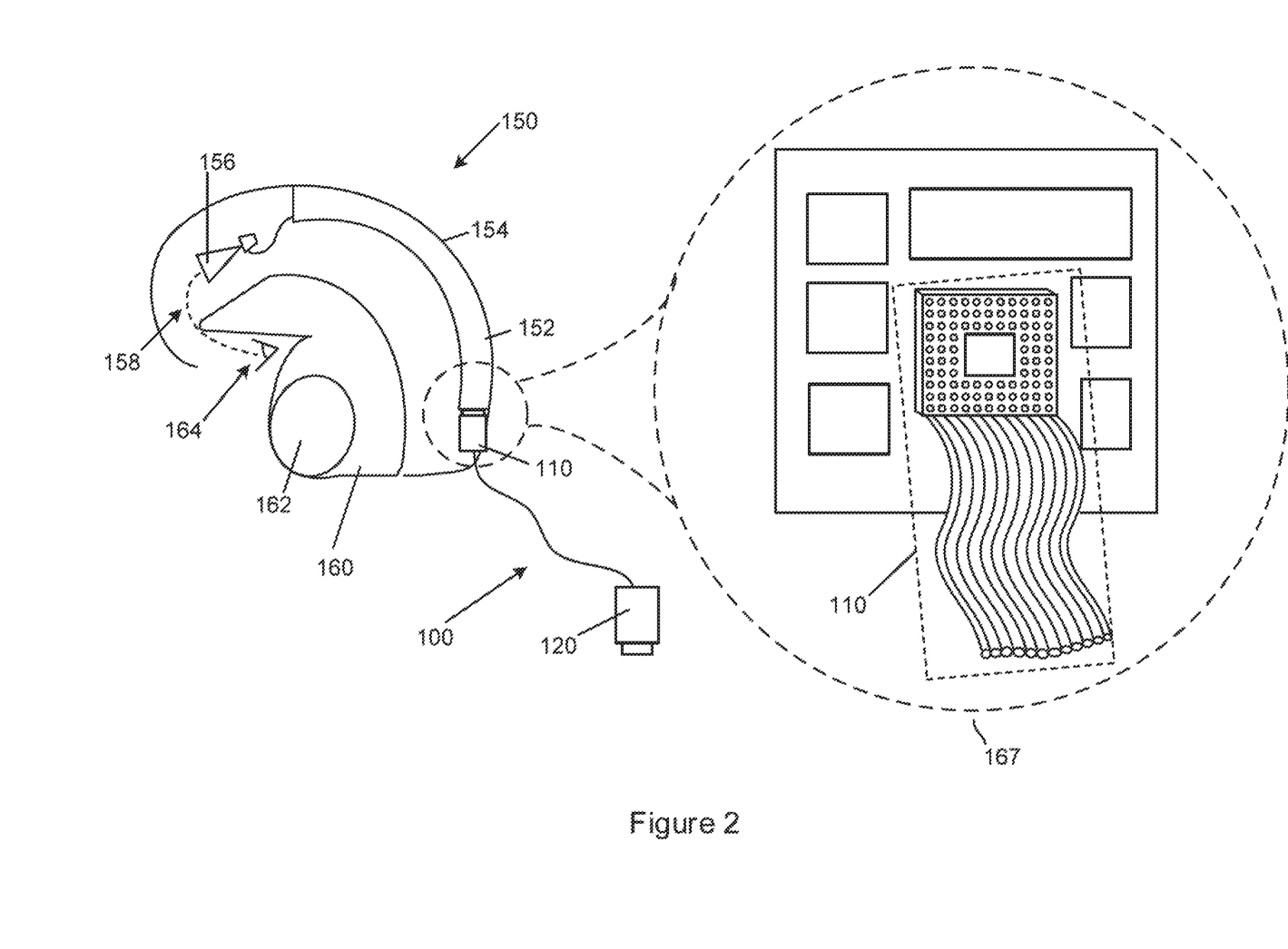
FIG. 2 is an application view showing an exemplary active optical cable connected to a helmet mounted display with a flexible or flex-rigid connector.

FIG. 1 is an application view showing an exemplary active optical cable device (AOC) 100 connected to a helmet mounted display with a transceiver module 110 implemented as a board mount connector shown in the inset 166. FIG. 2 is an application view showing an exemplary AOC 100 connected to a helmet mounted display with the transceiver module 110 implemented as a flexible or flex-rigid connector shown in the inset 167. The AOC device 100 includes a cable assembly 130 connected between two transceiver modules 110 and 120. The cable assembly 130 includes fiber optic cables and in some implementations both fiber optic cables and electrical cables. The cable assembly 130 can transmit both optical data and electrical power between the two transceiver modules 110 and 120. The transceiver modules 110 and 120 can perform data conversion between electrical data and optical data. The transceiver modules can also transmit electrical power between each other through the cable assembly 130.

The AOC device 100 is structurally customized for communicatively connecting with the electrical data interface in a helmet mounted display (HMD) 150. Specifically, each of the connector packaging structure for the transceiver modules 110 and 120 are customized for each specific physical connection desired. For example, the transceiver module 110 that communicatively connects with the electrical interface in the HMD 150 is designed to replace a copper wire connection. The inset 166 of FIG. 1 shows an exemplary location where the transceiver module 110 connects with the electrical interface of the HMD 150. The inset 166 shows a board-mount connector implementation of the transceiver module 110. Structurally, the board-mount connector of the transceiver module 110 can be implemented using a variety of connector packaging, including a flex-connector, a flex-rigid, or a rigid-flex connector. FIG. 2 shows an example of an exemplary flex, flex-rigid, or rigid-flex connector packaging for the transceiver module 110 that communicatively connects with the electrical interface in the HMD 150.

The transceiver modules 110 and/or 120 may include an electrical pluggable option, e.g., USB-type plug. In some embodiments, either or both of transceiver modules 110 and/or 120 may be implemented as any commercial connector such as USB or similar form factor with plastic molding.

The HMD 150 can include a soft inner shell 160 that contacts the head of a user and a hard outer shell 152 disposed over the inner shell to protect the head of the user from external environment. In addition, various electronics and data collection modules are disposed between the inner shell 160 and the outer shell 152 or attached to an external surface of the outer shell 152. The various electronics, data output, and data collection modules of the HMD 150 can include an ear piece 162 (one, or one for each ear) or headphones to provide audio data to the user; optics 158 (e.g., a camera, a display, or both) for displaying images and videos to the user, collecting image data from the eye of the user, or both; display engine 156 for processing the image and video data displayed and collected; and helmet electronics 154 for transmitting and receiving various electrical data to and from the various electronics, data output, and data collection modules of the HMD 150. The data collected from the data collection modules of the HMD 150 are transmitted through the AOC device 100 via the transceiver module 110 that interfaces with the helmet electronics 154. Also, data provided to the user through the data output device on the HMD 150 is received through the AOC device 100 via the transceiver module 110.

The transceiver module 120 at the other end of the AOC device 100 that interfaces with electronics (e.g., on an aircraft or associated with virtual reality devices) can be implemented using a quick-release connector packaging. The quick-release connector packaging allows the HMD 150 to detach from the electronics in case of an emergency, e.g., where the user wearing the HMD 150 needs to eject from an aircraft. Examples of the quick-release connector packaging includes a lanyard connector form-factor. In some implementations, the transceiver module 110 that interfaces with the HMD 150 can also be implemented using a quick-release connector packaging.

The AOC device 100 is advantageous compared to copper wire cables for a number of reasons. For example, the AOC device 100 is lighter and less bulky than the copper wire cables. Also, the AOC device 100 does not suffer from heat generation and thus does not need heavy insulations as the copper wire cables. In addition to the advantageous physical structure, the fiber optic cables in the AOC device 100 are more efficient than copper wires at reducing data loss, enhancing communication speed, and enhancing signal-to-noise ratio. Moreover, the AOC device 100 can support multiple data types and protocols.

Figure 3:
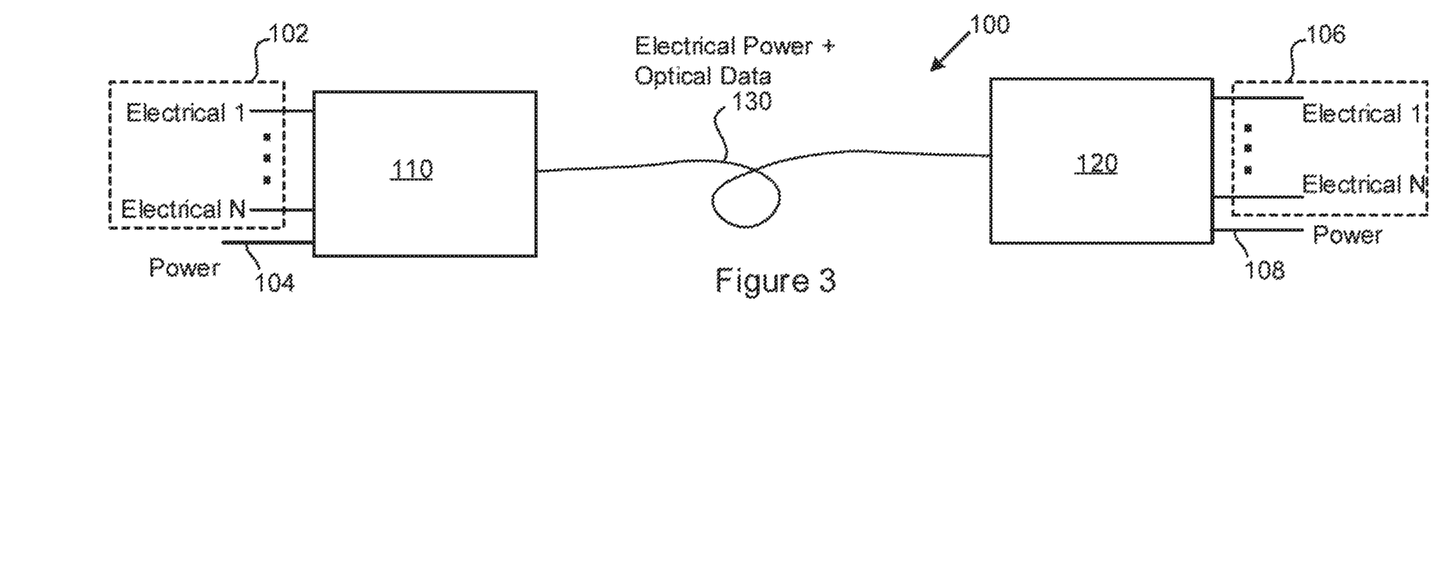
FIG. 3 is a block diagram of an exemplary active optical cable for a helmet mount display as shown in either FIG. 1 or FIG. 2, or for goggles shown in FIG. 10 or FIG. 11.

FIG. 3 is a block diagram showing a high-level layout of the exemplary active optical cable device 100 for a helmet mount display application or for application with goggles. For reference only, the AOC device 100 is herein described relative to use with the HMD 150. However, it should be understood that similar features apply to application with goggles 150A, as noted later with reference to FIGS. 10 and 11. The transceiver module 110 that interfaces with the electrical data interface of the HMD 150 can receive a number of electrical data 102 (e.g., Electrical 1, . . . Electrical N). The electrical data 102 is first converted into optical data by transceiver module 110. The optical data is carried to the other transceiver module 120 via the cable assembly 130. The transceiver module 120 receives the optical data and converts back the optical data into electrical data. The transceiver module 120 outputs electrical data (e.g., Electrical 1, . . . , Electrical N). The transceiver module 110 that interfaces with the electrical data interface of the HMD 150 can also receive electrical power 104 can transmit the electrical power via the cable assembly 130 to the other transceiver module 120 at the other end of the AOC device 100. Thus, in an embodiment, the cable assembly 130 can carry optical data and/or electrical power between the transceiver modules 110 and 120.

Transceiver Modules

FIGS. 4 through 7 are block diagrams showing various exemplary connectors of an active optical cable for a helmet mounted display. As shown in FIGS. 4 through 7, a number of different data types can be received as the electrical data 102, 502, 602, and 702. For example, a number of control data (e.g., serial 1, . . . serial N) and a number of video data (e.g., video 1, . . . video N) can be received from the HMD 150 as the electrical data at the transceiver module 110, 510, 610, and 710. FIGS. 4 through 7 illustrate different exemplary components of the transceiver modules 110, 510, 610, 710 that process the received electrical data 102, 502, 602, and 702 including data conversion between different formats, protocols, etc.

Figure 4:
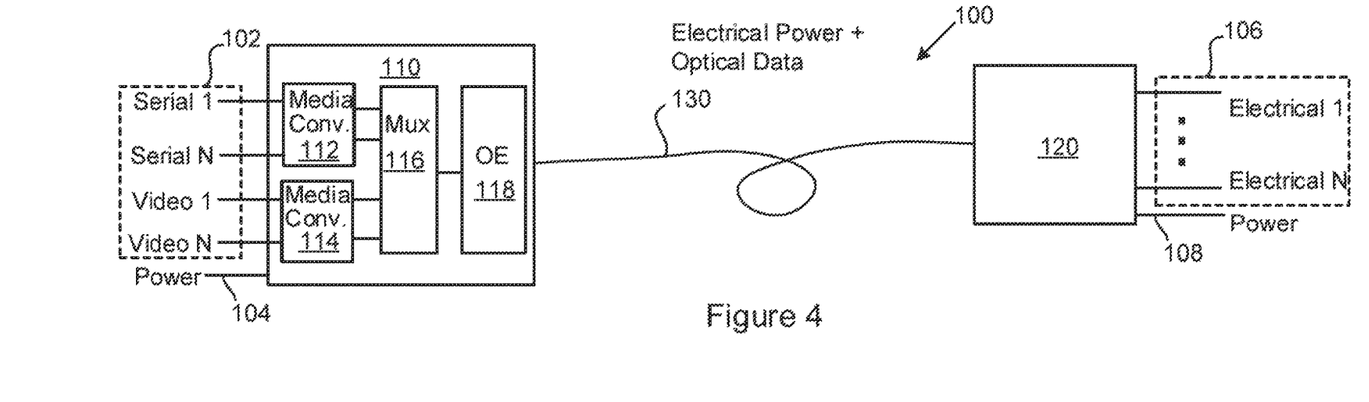
FIGS. 4-7 are block diagrams showing various exemplary connectors of an active optical cable for a helmet mounted display.

For example, FIG. 4 shows the exemplary transceiver module 110 of the exemplary AOC device 100 with media converters 112, 114, a multiplexer 116, and an optical engine 118. The transceiver module 110 that interfaces with the electrical interface of the HMD 150 can include media converters 112 and 114 for converting electrical serial data and video data respectively to a common format, for example. The media converters 112 and 114 can process multiple control serial data and video data, for example. The media converters 112 and 114 can be implemented to be substantially similar to media converter 850 in FIG. 8 below. See description of the media converter 850 with respect to FIG. 8 below.

The output of the media converters 112 and 114 are processed by a multiplexer 116 to selectively forward the outputs of the media converters 112 and 114 into the optical engine 118 for converting into optical data. The optical engine 118 can be implemented to be substantially similar to the optical engine 890 described with respect to FIG. 8 below. The cable assembly 130 carries the optical data to the other transceiver module 120 at the other end of the AOC 100 that interfaces with the electronics using a quick-release connector packaging. The transceiver module 120 converts back the optical data carried by the cable assembly 130 into electrical data 106 (e.g., Electrical 1, . . . , Electrical N). For example, In addition, in an embodiment, the transceiver module 110 forwards the electrical power 104 to the other transceiver module 120 via the cable assembly 130 and is output as electrical power 108.

In some implementations, the other transceiver module 120 at the other end of the AOC device 100 can be implemented to be substantially similar to the transceiver module 110.

Figure 5:
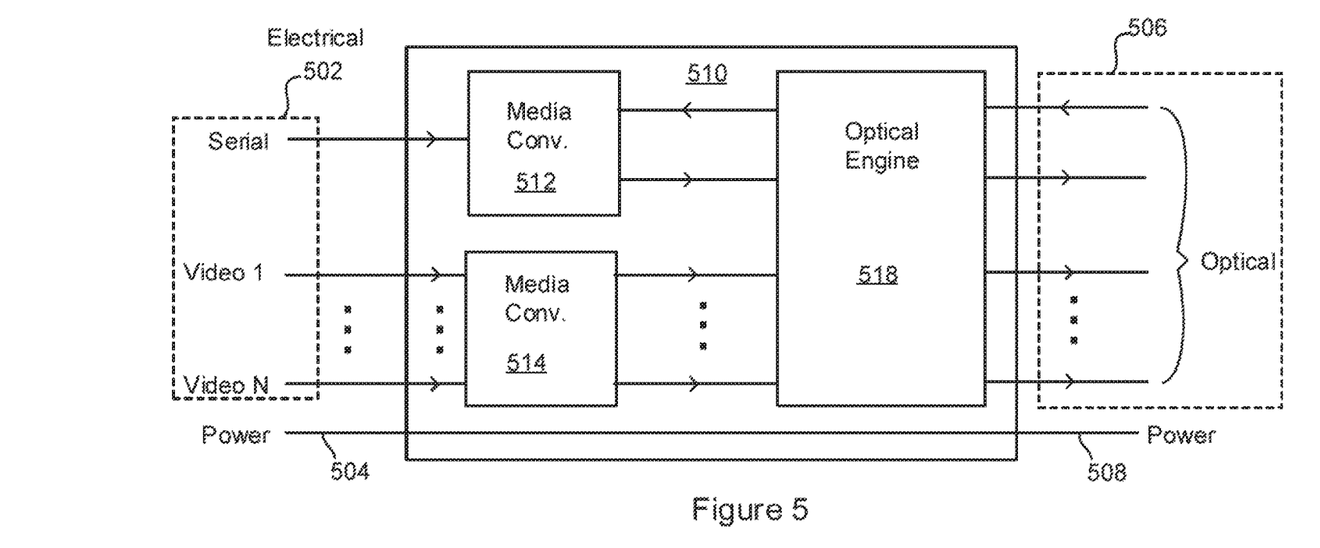

FIG. 5 shows another exemplary transceiver module 510 for communicatively connecting with the electrical data interface of the HMD 150. In the exemplar shown in FIG. 5, the transceiver 510 includes media converters 512 and 514 that processes electrical data 502, similar to the media converters 112 and 114 of FIG. 4. However, the media converters 512 and 514 are directly coupled to the optical engine 518 without a multiplexer. Thus, the optical engine 518 in FIG. 5 is able to process multiple data in parallel to output the optical data 506. Also, the transceiver 510 can receiver electrical power 504 and forward it as electrical power 508 to the other transceiver module (not shown) at the other end of the AOC.

Figure 6:
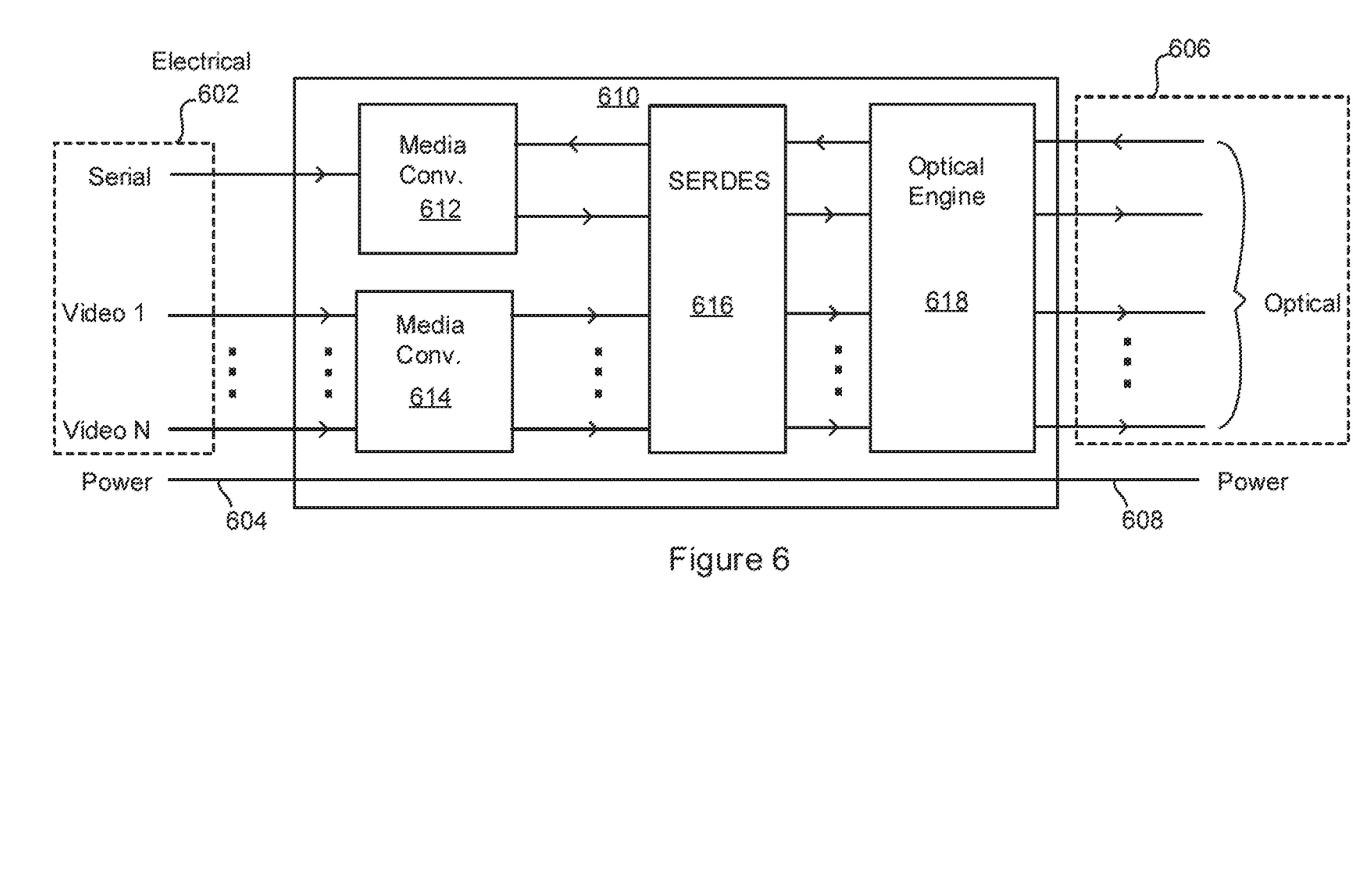

FIG. 6 shows another exemplary transceiver module 610 for communicatively connecting with the electrical data interface of the HMD 150. In the exemplar shown in FIG. 6, the transceiver 610 includes media converters 612 and 614 that process electrical data 602, similar to the media converters 112 and 114 of FIG. 4. However, the media converters 612 and 614 are communicatively coupled to a SERDES circuit 616. The SERDES 616 can be implemented to be substantially similar to SERDES 855 described with respect to FIG. 8 below. For example, the output of the media converters 612 and 614 can be multiplexed or demultiplexed using the SERDES 616 into one or more higher speed serial data streams to reduce the number of optical channels. The decision to include the SERDES 616 (multiplexing and/or demultiplexing) can be a design decision based on the unique requirements of the active optical cable. Such moderately high data rate inputs may all be converted to a common interface thereby allowing different interface blocks to be interchanged with minimal change to the overall board design. The output of the SERDES circuit 616 is coupled to an optical engine 618 to convert to optical data. Thus, the optical engine 618 in FIG. 6 is able to process multiple data in parallel to output the optical data 606. Also, the transceiver 610 can receive electrical power 604 and forward it as electrical power 608 to the other transceiver module (not shown) at the other end of the AOC. The data communication between the media converter 612 and the SERDES 616 is bidirectional. Similarly, the data communication between the SERDES 616 and the optical engine 618 is bidirectional.

Figure 7:
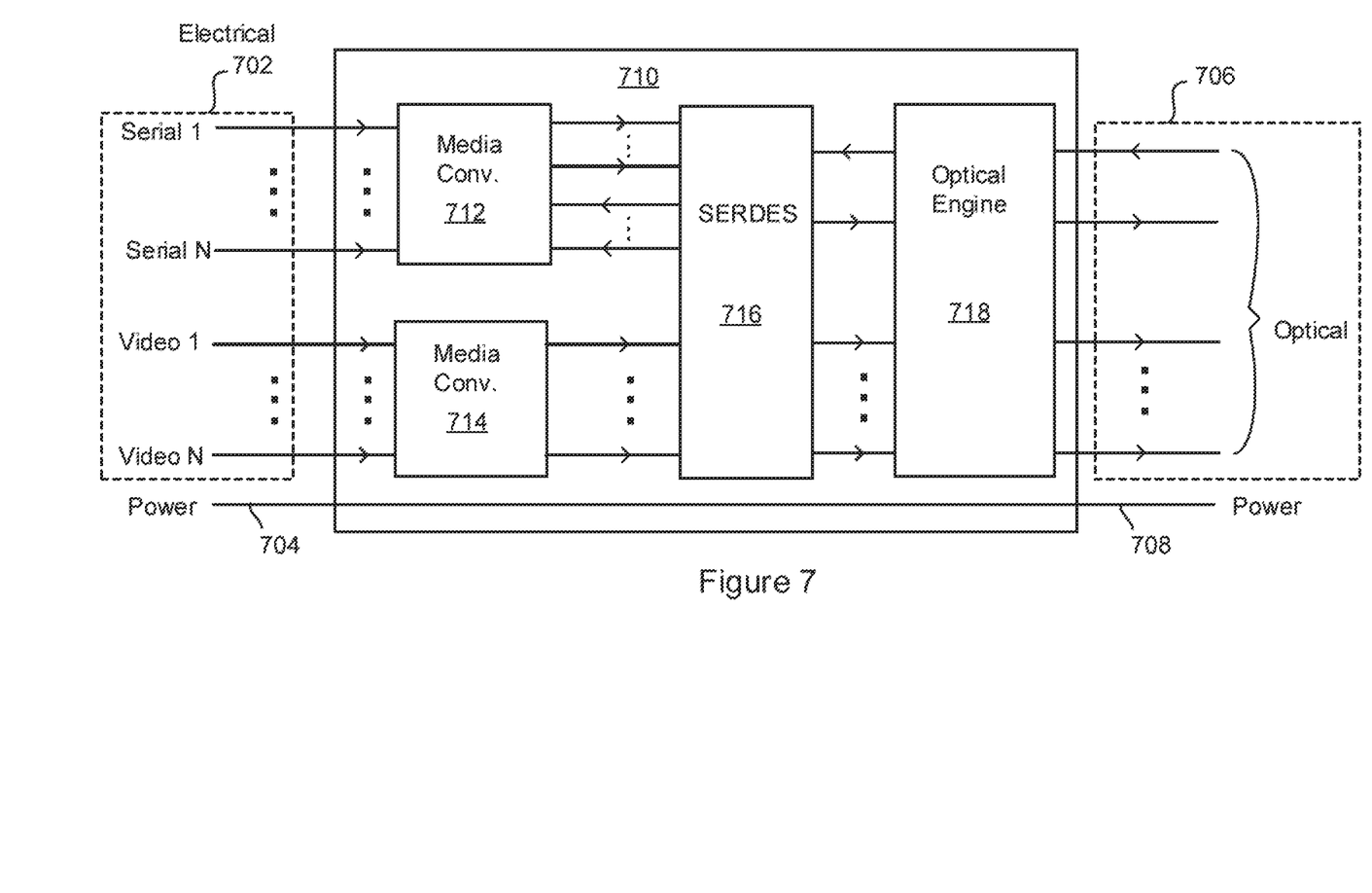

FIG. 7 shows another exemplary transceiver module 710 for communicatively connecting with the electrical data interface of the HMD 150. The transceiver module 710 is substantially similar to the transceiver module 610 except that the transceiver module 710 is illustrated to process multiple control serial data (serial 1, . . . serial N). Consequently, multiple bidirectional data communication paths are shown between a media converter 712 and a SERDES 716. In the exemplar shown in FIG. 7, the transceiver 710 includes media converters 712 and 714 that process electrical data 702, similar to the media converters 612 and 614 of FIG. 6. The media converters 712 and 714 are communicatively coupled to a SERDES circuit 716 and can process multiple serial data. The SERDES 716 can be implemented to be substantially similar to SERDES 855 described with respect to FIG. 8 below. For example, the output of the media converters 712 and 714 can be multiplexed or demultiplexed using the SERDES 716 into one or more higher speed serial data streams to reduce the number of optical channels. The decision to include the SERDES 716 (multiplexing and/or demultiplexing) can be a design decision based on the unique requirements of the active optical cable. Such moderately high data rate inputs may all be converted to a common interface thereby allowing different interface blocks to be interchanged with minimal change to the overall board design. The output of the SERDES circuit 716 is coupled to an optical engine 718 to convert to optical data. Thus, the optical engine 718 in FIG. 7 is able to process multiple data in parallel to output the optical data 706. Also, the transceiver 710 can receiver electrical power 704 and forward it as electrical power 708 to the other transceiver module (not shown) at the other end of the AOC. The data communication between the media converter 712 and the SERDES 716 is bidirectional. Similarly, the data communication between the SERDES 716 and the optical engine 718 is bidirectional.

AOC Device Implementations

Figure 8:
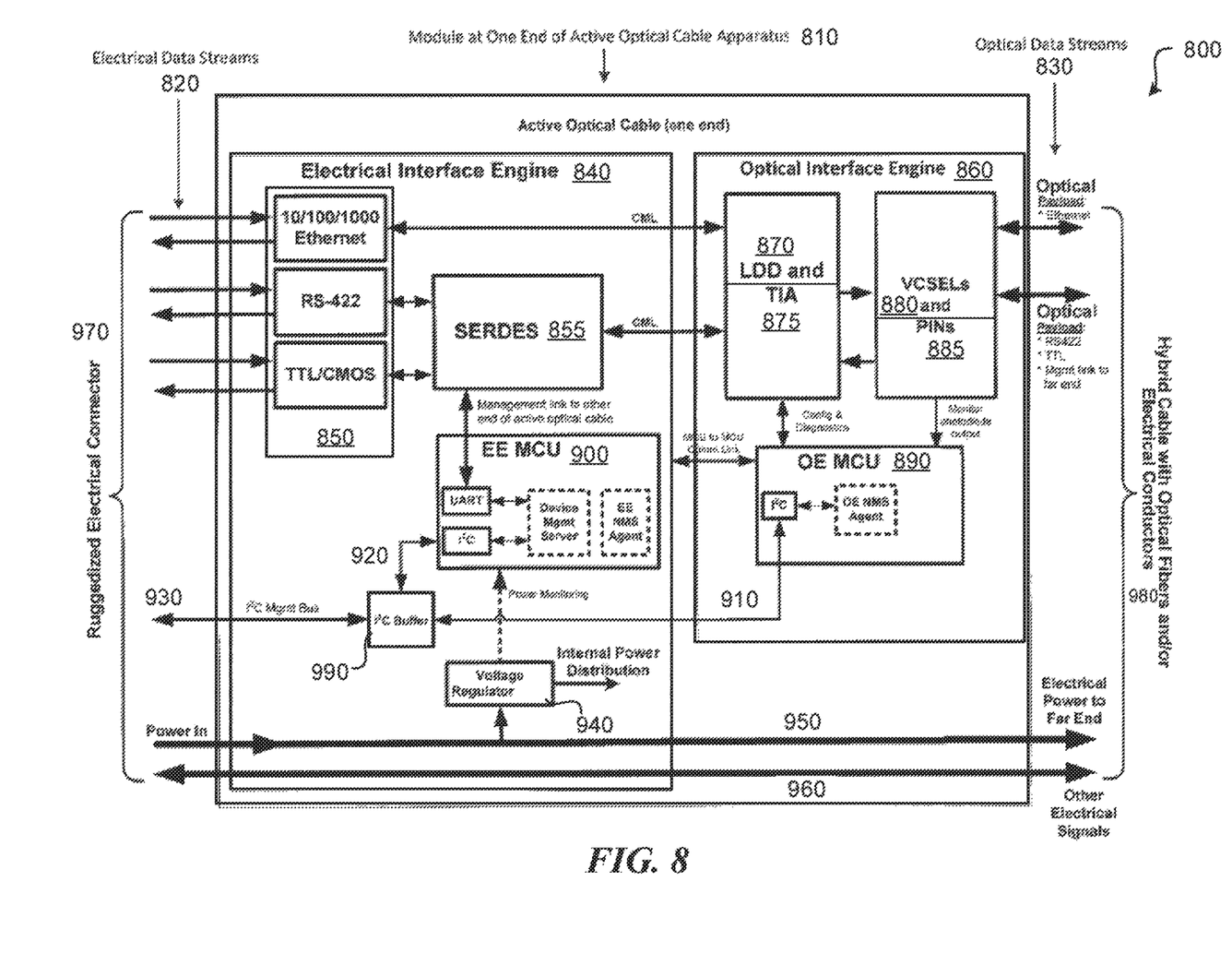
FIG. 8 is a schematic block diagram illustrating an exemplary transceiver module for an active optical cable for a helmet mounted display.

FIG. 8 is a schematic block diagram illustrating another exemplary transceiver module 800 for an AOC. The AOC transceiver module 800 can include electronics, optoelectronics, or both for modular implementation of electrical-to-optical conversion, optical-to-electrical conversion, or both conversions for several representative data types. The AOC transceiver module 800 also illustrates electrical power distribution, electrical signal distribution, voltage regulation, health monitoring, test channel implementation, or a combination of any or all of these functionalities.

FIG. 8 illustrates an example of a transceiver module at one end of an active optical cable apparatus 810 in which multiple electrical data streams 820 may be converted into optical data streams 830 and vice versa. The optical cable apparatus 810 can be used to implement AOCs 100 (including transceiver modules 110 and 120), AOC modules 510, 610, and 710, or any other AOCs disclosed in FIGS. 1 through 7. Modular functionality blocks of the transceiver 800 are illustrated in FIG. 8 for simplicity. For example, an electrical interface engine 840 and optical interface engine 860 are shown. The electrical interface engine 840 may have electrical media convertors 850, SERDES 855, microcontrollers (MCU) 900, and voltage regulators and isolation 840. The optical interface engine 860 may have laser diode drivers (LDD) 870 and transimpedance amplifiers 875, optical benches, VCSELs 880, and PIN photodetectors 885, and microcontrollers (MCU) 890. Health monitoring and built-in test channels may be implemented via communication 910 from the optical engine MCU 890 and communication 920 from the electrical interface engine MCU 900 with communication 930 outside the module at one end of the active optical cable 810 using pins in the ruggedized electrical connector 970. The module at one end of the active optical cable apparatus 810 may have power distribution 950 through the cable and electrical signal distribution 960 through the cable. Optical signal data streams 830, electrical signals 960, and electrical power 950 are connected to the hybrid cable assembly 980. Also, an I²C buffer can be included to receiver communication 930 including data from I²C management bus.

As shown on the left side of FIG. 8, electrical data streams 820 may be inputs and/or outputs. The electrical data streams 820 may be converted from their native state into serial data streams. For example, 10/100/1000 BaseT Tx Ethernet may be converted to and/or from a serial differential signal data stream using the media convertors 850 that may interface with a standard laser diode driver (LDD) 870 and/or transimpedance amplifier (TIA) 875 circuitry. Other data types such as serial digital interface (SDI) and/or CameraLink video data may also be converted to or from a serial differential signal data stream to interface with the LDD 870, TIA circuits 875, or both. Although for operation in many harsh environments it may be desirable to keep the data rates as low as possible, moderately high-speed data types (~10 Mbps to 5 Gbps) may be multiplexed or demultiplexed or both using the SERDES 855 into one or more higher speed serial data streams to reduce the number of optical channels. Including the SERDES 855 (multiplexing and/or demultiplexing) functionality block may be a design decision based on the unique requirements of the active optical cable. Such moderately high data rate inputs may all be converted to a common interface thereby allowing different interface blocks to be interchanged with minimal change to the overall board design.

As shown on the left side of FIG. 8, low data rate signals, such as transistor-transistor logic (TTL), RS-422, or both may also be converted using the media convertors 850 to serial data streams with a common, interchangeable format, in this case TTL. To reduce the number of optical channels, the low speed signals may preferably be multiplexed and/or demultiplexed. The inputs, outputs, or both of these building blocks may be differential signals that may interface with the LDD 870, the TIA 875 or both circuitries.

The exemplary transceiver illustrated in FIG. 8 may be used to convert a wide variety of data types, each having their own modular media interface electronics. Examples of data types that may be supported may be low-speed analog sensor signals, servo signals, or both where the interface electronics may include analog-to-digital (A/D) conversion, digital-to-analog (D/A) conversion, or both types of conversions. Other examples may be serial differential signal data types such as 10G Ethernet, Serial RapidIO, FibreChannel, or both as well as data types with different electrical formats, such as FireWire, USB, or both types for example. In addition, many low-speed data types such as MIL-STD-1553, ARINC-429, RS-232, RS-485, pulse-width modulation (PWM), interlocks, or both may be supported using this approach.

On the right side of FIG. 8, the optical interface engine 860 is shown. The optical interface engine 860 may have VCSELs 880 and pin photodetectors 885. In some embodiments, an optical bench OB may be used and may include VCSELs 880, for transmitting the optical signals, as well as pin photodetectors 885 for receiving the optical signals. The VCSELs 880 may be driven by the LDD circuits 870 or the pin photodetectors 885 interface with the TIA circuits 875, or both. Depending on the data rates present in a given active optical cable, different data rate LDD 870, TIA 875, or both circuitries can be used, as well as different data rate VCSELs 880, pin photodetectors 885, or both. The design can be modular so that these different components may be interchanged in the optical interface engine 860 with minimal changes to the design.

In some embodiments, the optical outputs from the VCSELs 880, the incoming optical signals received by the pin photodetectors, or both optical outputs and signals can be directly monitored with photodetectors, such as monitor photodetectors to enable control of the optical interface engine 850 over temperature and/or for use in health monitoring.

In some embodiments, an optical block with optics couples the light into an array of fibers, out of an array of fibers, or both. This short array of fibers may be terminated in an optical connector mounted on the board. In the design of the photodetectors that perform the monitoring, the optical block can also be modular to allow any combination of VCSELs 880, photodetectors 885, or both to be used.

In some embodiments, a microcontroller (MCU) 890 in the optical interface engine 850 may be used to monitor temperature, transmitted optical powers, or both to enable the VCSEL 880 bias or modulation currents, or both to be optimized over a wide temperature range or to compensate for aging or other degradation, or a combination of these. Since the received optical powers may also be monitored, this information may be transmitted over the health monitoring communication channel 910 shown in FIG. 8, enabling the transmitted power to be adjusted to compensate for changes in the optical coupling or fiber cable assembly, or both. In addition, the media convertor electronics 850 and the SERDES 855 may also report the status of components or systems, or both that the active optical cable may be interconnecting or controlling, or both via the communication channel 920 from the electrical interface engine MCU 900. One example of this may be monitoring the current being drawn by a servo to determine when replacement may be necessary. This comprehensive health information may be compiled by one or more MCUs, both for the active optical cable itself as well as upstream components. The health information may be transmitted optically or electrically to both ends of the active optical cable and/or may be accessible outside the cable via pins on the electrical connector and the communication channel 930 which may be implemented using an I²C interface 990. This external interface with the health monitoring channel may be used for health monitoring as well as built-in test functionality, maintenance functions such as determining parts that need replaced before they fail or upgrading the firmware of the cable, or both.

A voltage regulator 940 illustrated in FIG. 8 can enable the active optical cable to operate on a wide variety of supply voltages, such as 5V, 12V, 24V, and/or 28V. Since the voltage regulator 940 may be used in addition to standard noise filtering, the active optical cable may tolerate larger voltage variations, larger voltage ripple, or higher noise, or a combination of these than other optical modules. Such capabilities may be important for operation in harsh environment applications where high levels of EMI or other noise sources, or a combination of these may often be present. As shown in FIG. 8, some of the incoming power may be tapped off for use in the module on one end of the active optical cable and/or the rest of the power may be passed through the module or transmitted over the cable assembly to the other end, or both. This power may be used to power the other end of the module as well as upstream components or systems, or a combination of these. Depending of the requirements, the voltage regulator 840 may also be used to regulate the voltage supply for upstream requirements and may include electronics for power isolation. Using the voltage regulator 940 that may accept a wide variety of incoming voltage levels may allow the design of the active optical cable to be modular.

Figure 9:
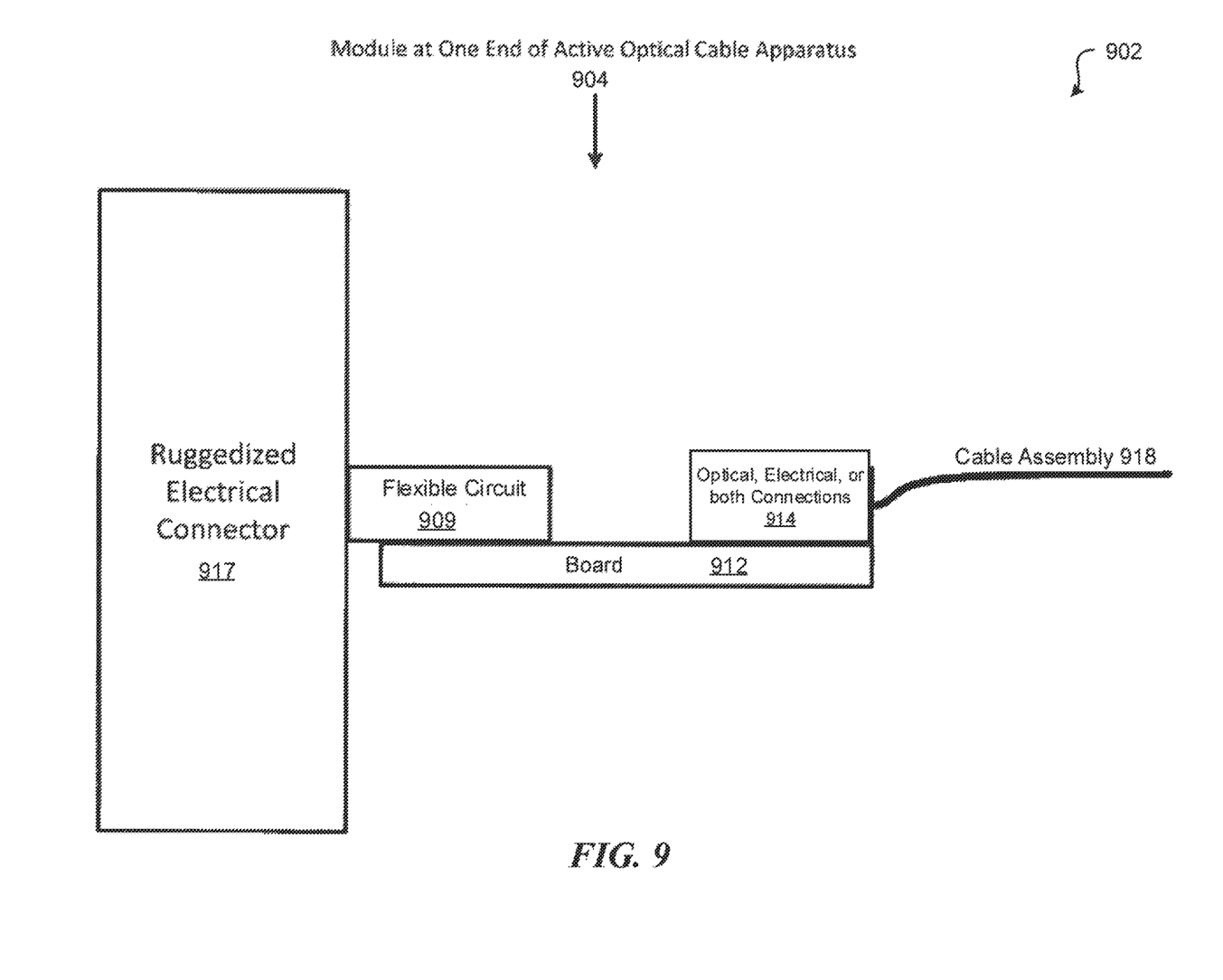
FIG. 9 is a schematic diagram of an exemplary active optical cable transceiver module at one end of an active optical cable device.

FIG. 9 is a schematic diagram of an exemplary AOC transceiver module 902 at one end of an AOC 904. The AOC transceiver module 902 can be used to implement AOC connectors 110, 510, 610 and 710 in FIGS. 1 through 7 or any other AOC connectors of FIGS. 1 through 7. In addition, the AOC transceiver module 902 can be implemented to be substantially similar to the AOC transceiver 800 in FIG. 8. The AOC transceiver module 902 can be connected to a cable assembly 918, including a hybrid cable assembly with optical fibers, electrical conductors, or both for power distribution, signal distribution, connections of the cable assembly to a board (e.g., rigid board, flexible board or flexible circuit), a ruggedized electrical connector to board connections, or a combination of any or all of these connectors.

For example, a cable assembly 918 can include optical fibers, electrical conductors, or both for power distribution, electrical signal distribution, or both. In an embodiment, one end of the active optical apparatus 904 can have connections 914, such as optical connections, electrical connections, or both for connecting the cable assembly 918 to a board 912. In another embodiment, the cable assembly 918 can be directly coupled (for example soldered or fastened) to the board 912. The end of the active optical cable apparatus 904 may have a ruggedized electrical connector 917 with a flexible circuit 909 for connecting to the board 912. In an embodiment, the board 912 can be a flexible board or a flexible circuit. In another embodiment, the board 912 can be a rigid board such as a printed circuit board (PCB). In yet another embodiment, the board 912 can have a flexible portion and/or a rigid portion.

In an embodiment, as shown in FIG. 9, optical connections, electrical connections, or both from the cable assembly 918 may be made with the connections 914 that include optical connections, electrical connections or both to the board 912, allowing the boards 912 for each end of the active optical cable apparatus 904 to be tested before final assembly. In another embodiment, instead of using connections 914, the cable assembly 918 can be directly coupled (e.g., soldered, fastened, etc.) to the board 912. Such embodiments may be conducive to maintaining the modular approach of the design up to the boards 912.

FIG. 9 shows that the electrical connector, preferably a ruggedized, blind-mateable electrical connector 917 such as a MIL-DTL-38999, may be connected to the board 912 by using another connector, such as with a flexible circuit, 909. This modular approach may make changing the pin-out or connector, or both relatively simple, requiring minimal, if any, changes to the board 912. The modular approach may also enable more than one board 912 to be used with the ruggedized electrical connector 917 if additional area may be needed for the interface electronics or optical engines, or both.

The module at the end of the active optical cable apparatus 904 may be sealed against contamination or shielded from electromagnetic interference, or both by a conductive backshell or over-molding, or both. The cable assembly 918, containing optical fibers, electrical conductors, or both for power transmission, electrical signal transmission, or both may also be jacketed with appropriate material to ruggedize the cable assembly 918 to the target environment.

Depending on the requirements of the active optical cable, electrical conductors may be included to support more than one supply voltage or may also be included to support the transmission of electrical data, such as analog data or interlocks that cannot be transmitted optically due to system requirements.

Implementation in Goggles

Figure 10:
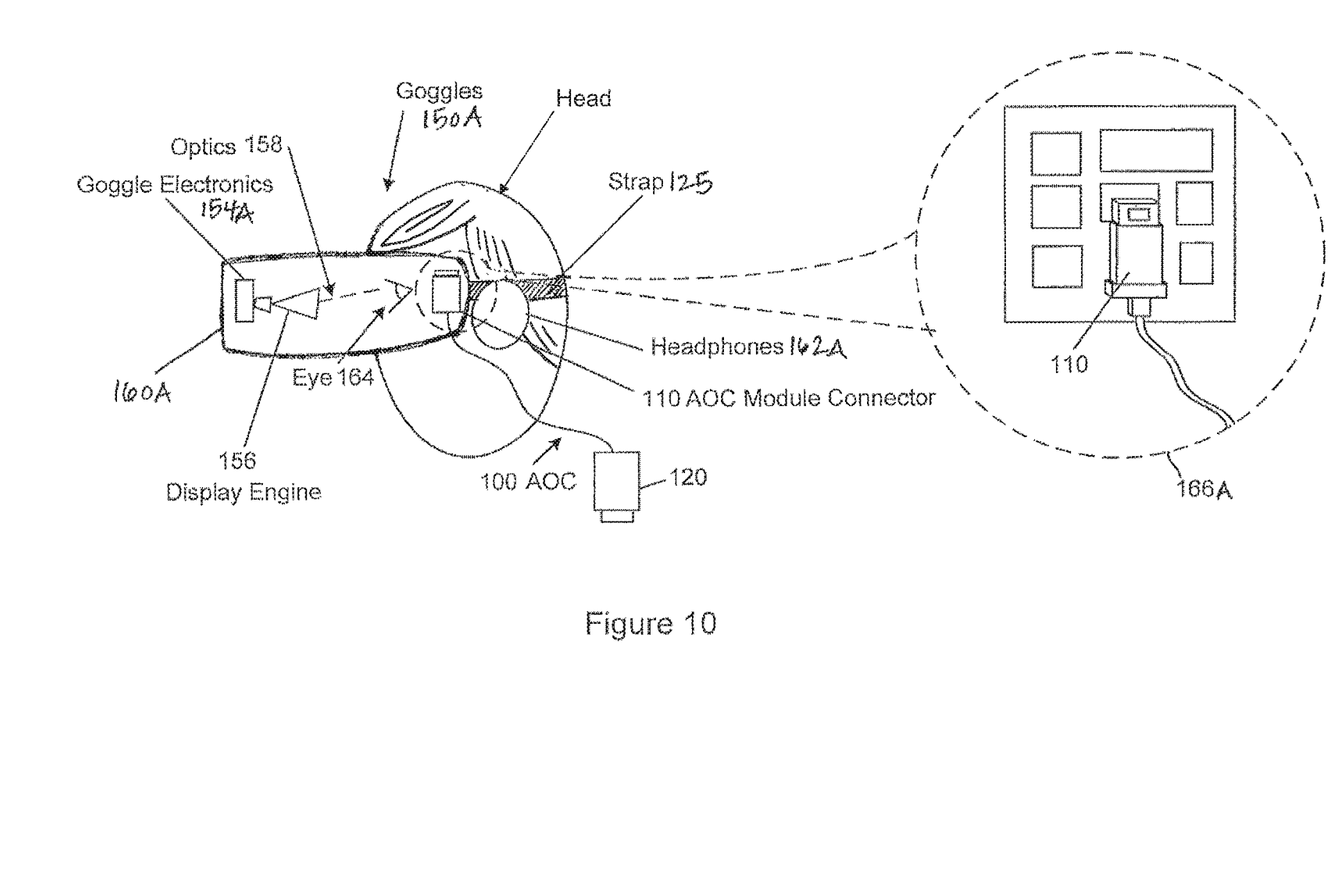
FIG. 10 is an application view showing an exemplary active optical cable connected to goggles with a board mount connector.
Figure 11:
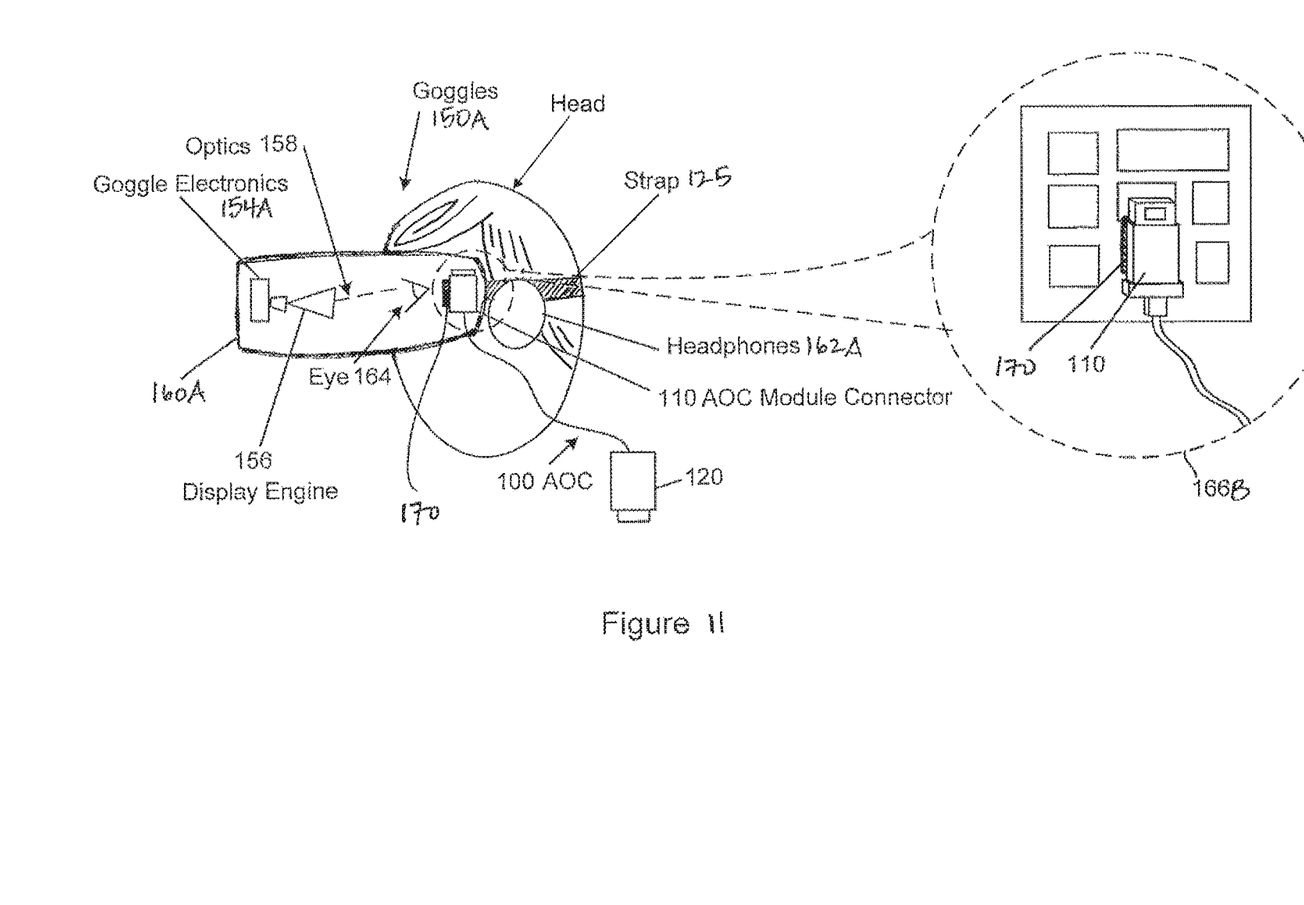
FIG. 11 is an application view showing an exemplary active optical cable connected to goggles with a flexible or flex-rigid connector.

FIG. 10 is an application view showing yet another embodiment of an AOC 100 connected to a set of goggles 150A with transceiver module 110 implemented as a board mount connector (e.g., hard-wired or hard-mounted) shown in the inset 166A. FIG. 11 is an application view showing an exemplary AOC 100 connected to a set of googles with the transceiver module 110 implemented as a flexible or flex-rigid connector shown in the inset 166B. The flexible connector in inset 166B may include an electrical plug (schematically represented as 170 in FIG. 11) on its end so as to allow the transceiver module 110 to be removably connected to the goggles 150A.

The features shown in FIGS. 10 and 11 may be similar to those as previously discussed with reference to FIGS. 1-9, for example. Accordingly, similar reference numbers are used in FIGS. 10 and 11 from the previous Figures to reference similar parts. Further, the entire description relating to such features may not be explicitly repeated below; however, one should understand that the features associated with such parts as previously described similarly apply to the embodiments illustrated in FIGS. 10 and 11.

As described previously, the AOC device 100 includes a cable assembly 130 connected between two transceiver modules 110 and 120. The cable assembly 130 includes fiber optic cables and in some implementations both fiber optic cables and electrical cables. The cable assembly 130 in either embodiment may include one or two optical fibers and an optional copper line for power, for example. The cable assembly 130 can transmit both optical data and electrical power between the two transceiver modules 110 and 120. The transceiver modules 110 and 120 can perform data conversion between electrical data and optical data. The transceiver modules can also transmit electrical power between each other through the cable assembly 130.

The AOC device 100 is structurally customized for communicatively connecting with the electrical data interface in the goggles 150A. Specifically, each of the connector packaging structure for the transceiver modules 110 and 120 are customized for each specific physical connection desired. For example, the transceiver module 110 that communicatively connects with the electrical interface in the goggles 150A is designed to supplement or replace a copper wire connection. The insets 166A and 166B of FIGS. 10 and 11 show exemplary locations where the transceiver module 110 connects with the electrical interface of the goggles 150A. The transceiver modules 110 and/or 120 may include an electrical pluggable option, e.g., USB-type plug. In some embodiments, either or both of transceiver modules 110 and/or 120 may be implemented as any commercial connector such as USB or similar form factor with plastic molding.

The goggles 150A may include an outer shell 160A for placement in front of and/or around the eyes 164 of the user. A strap 125 may be connected to the outer shell 160A to contact and secure the outer shell 160A on the head of the user. In addition, various electronics and data collection modules are disposed in the outer shell 160A (or, in some cases, attached to an external surface of the outer shell 160A). The various electronics, data output, and data collection modules of the goggles 150A can include an ear piece 162 (one, or one for each ear) or headphones 162A to provide audio data to the user; optics 158 (e.g., a camera, a display, or both) for displaying images and videos to the user, collecting image data from the eye of the user, or both; display engine 156 for processing the image and video data displayed and collected; and goggle electronics 154A for transmitting and receiving various electrical data to and from the various electronics, data output, and data collection modules of the goggles 150A. The data collected from the data collection modules of the goggles 150A are transmitted through the AOC device 100 via the transceiver module 110 that interfaces with the goggle electronics 154A. Also, data provided to the user through the data output device on the goggles 150A is received through the AOC device 100 via the transceiver module 110.

The transceiver module 120 at the other end of the AOC device 100 that interfaces with electronics (e.g., on an aircraft or associated with virtual reality devices) may be implemented using a quick-release connector packaging, in accordance with one embodiment. The quick-release connector packaging allows the goggles 150A to detach from the electronics, including in case of an emergency. Examples of the quick-release connector packaging includes a lanyard connector form-factor. In some implementations, the transceiver module 110 that interfaces with the goggles 150A may also be implemented using a quick-release connector packaging.

Again, the use of the AOC device 100 with goggles 150A is advantageous compared to devices using only copper wire cables because it is lighter and less bulky than the copper wire cables, and does not suffer from similar heat generation. In addition to the advantageous physical structure, the fiber optic cables in the AOC device 100 are more efficient than copper wires at reducing data loss, enhancing communication speed, and enhancing signal-to-noise ratio. Moreover, the AOC device 100 can support multiple data types and protocols.

As previously noted, the features described in the block diagram of FIG. 3 as well as the transceiver modules of FIGS. 4 through 7 also apply to the goggles 150A, and are not repeated here. Thus, although the previous description references the HMD 150, it should be understood that the connectors of the active optical cable may be used with the herein disclosed goggles 150A, and that the features, configurations, and functions of the AOC device 100 and transceiver modules 110 and 120 as described above with reference to FIGS. 3-7 similarly apply to goggles 150A.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A transceiver module of an active optical cable configured to physically couple to a wearable display contained in goggles, the transceiver module of the active optical cable comprising:
   a quick-release connector packaging configured to physically couple with an electrical data interface of the goggles, the quick-release connector packaging including an electrical connector to receive electrical data;
   one or more media converters configured to receive the electrical data of multiple formats from the goggles and convert the received electrical data to a common format; and
   an optical engine communicatively coupled to the one or more media converters to output the converted electrical data as optical data;
   wherein the quick-release connector packaging comprises a lanyard connector communicatively coupled to the active optical cable,
   wherein the transceiver module is configured to receive an electrical power signal from the goggles and forward the received electrical power signal and the optical data to an additional transceiver module located at an opposite end of the active optical cable, and
   wherein the transceiver module is implemented for detachment from the goggles using the quick-release connector packaging.

2. The transceiver module of claim 1, including a multiplexer disposed between the one or more media converters and the optical engine.

3. The transceiver module of claim 1, including a serializer/deserializer (SERDES) disposed between the one or more media converters and the optical engine.

4. The transceiver module of claim 1, wherein the one or more media converters includes a first media converter coupled to receive serial data and a second media converter coupled to receive video data.

5. The transceiver module of claim 4, wherein the first media converter is configured to receive multiple serial data.

6. The transceiver module of claim 4, wherein the second media converter is configured to receive multiple video data.

7. The transceiver module of claim 1, wherein the rigid-flex or flex connector packaging of the transceiver module includes a board mounted connector.

8. A system comprising:
   goggles comprising:
      a housing or a shell, the housing or the shell being configured for placement around eyes of a user;
      a strap connected to the housing or the shell, the strap configured for placement around a head of the user in order to secure the housing or the shell onto the head of the user for placement around the eyes;
      the housing or the shell comprising:
         an electrical data interface for transmitting and receiving various electrical data;
         data collection modules for collecting electrical and image and video data;
         optics comprising a display for displaying the image and video data to the eyes of the user while the user is wearing the goggles; and
         a display engine for processing the image and video data displayed and collected;
         the optics and the display engine being provided in the housing or the shell such that the image and video data is displayed to the eyes of the user while wearing the goggles;
   a first transceiver module having a rigid-flex or flex connector packaging configured to physically couple with the electrical data interface of the housing or shell of the goggles, the rigid-flex or flex connector packaging including an electrical connector to receive electrical data, wherein the first transceiver module includes:
      one or more media converters configured to receive electrical data of multiple formats from the goggles and convert the received electrical data to a common format, and
      an optical engine communicatively coupled to the one or more media converters to output the converted electrical data as optical data;
   a cable assembly including at least fiber optic cables with one end of the cable assembly communicatively coupled to the first transceiver module having the rigid-flex or flex connector packaging to receive the optical data output from the optical engine of the first transceiver module; and
   a second transceiver module having a quick-release connector packaging and communicatively coupled to other end of the cable assembly to receive the optical data,
   wherein the first and second transceiver modules of the cable assembly are configured to interface the goggles and electronics from another device, and the quick-release connector packaging is configured for detachment from said electronics,
   wherein the second transceiver module is configured to convert the optical data carried by the cable assembly into electrical data for said electronics.

9. The system of claim 8, wherein the first transceiver module comprises a plug for providing a removable connection of the first transceiver module with respect to the housing of the goggles.

10. The system of claim 8, including a multiplexer disposed between the one or more media converters and the optical engine.

11. The system of claim 8, including a serializer/deserializer (SERDES) disposed between the one or more media converters and the optical engine.

12. The system of claim 8, wherein the one or more media converters includes a first media converter coupled to receive serial data and a second media converter coupled to receive video data.

13. The system of claim 8, wherein the first media converter is configured to receive multiple serial data.

14. The system of claim 8, wherein the second media converter is configured to receive multiple video data.

15. The system of claim 8, wherein the rigid-flex or flex connector packaging of the transceiver module includes a board mounted connector.

16. The transceiver module of claim 1, wherein the additional transceiver module interfaces with electronics of another device and is also implemented using a quick-release connector packaging for detachment from the electronics, the quick-release connector packaging comprising a lanyard connector, and wherein the additional transceiver module is configured to convert the received optical data into electrical data.

17. An active optical cable for goggles, the active optical cable comprising:
   a first transceiver module configured to physically couple with an electrical data interface of the goggles, wherein the first transceiver module includes:
      one or more media converters configured to receive electrical data of multiple formats from the goggles and convert the received electrical data to a common format, and
      an optical engine communicatively coupled to the one or more media converters of the first transceiver module to output the converted electrical data as optical data;
   a cable assembly including at least fiber optic cables with a first end of the cable assembly communicatively coupled to the first transceiver to receive the optical data output from the optical engine of the first transceiver module; and
   a second transceiver module that interfaces with electronics of another device implemented using a quick-release connector packaging for detachment from the electronics, the quick-release connector packaging comprising a lanyard connector, wherein the quick-release connector packaging is communicatively coupled to a second end of the cable assembly to receive the optical data and that allows detachment of the goggles, the second transceiver module being configured to convert the received optical data into electrical data.

18. The active optical cable of claim 17, wherein the first transceiver module is further configured to receive an electrical power signal and forward the received electrical power signal to the second transceiver module in addition to the optical data.

19. The active optical cable of claim 18, wherein the first transceiver module is implemented using an additional quick-release connector packaging.

20. The active optical cable of claim 17, wherein the first transceiver module includes a multiplexer and/or a serializer/deserializer (SERDES) disposed between the one or more media converters and the optical engine.

21. The active optical cable of claim 17, wherein the one or more media converters of the first transceiver module includes a first media converter coupled to receive serial data and a second media converter coupled to receive video data.

22. The active optical cable of claim 17, wherein the first transceiver module includes a board mounted connector.

* * * * *